(12) United States Patent
Levasseur et al.

(10) Patent No.: US 6,409,106 B1
(45) Date of Patent: Jun. 25, 2002

(54) DRUM INTENDED FOR A MACHINE FOR PROCESSING WASTE AND A CORRESPONDING MACHINE

(75) Inventors: Jean-Pierre Levasseur, Impasse des Bouvreuils; Bernard Combaneyre, allée Jean de la Fontaine, both of (FR)

(73) Assignee: Vinci Environnement, Rueil Malmaison Cedex (FR)

(*) Notice: Subject to any disclaimer, the term of this patent is extended or adjusted under 35 U.S.C. 154(b) by 0 days.

(21) Appl. No.: 09/628,872

(22) Filed: Jul. 24, 2000

(30) Foreign Application Priority Data

Jul. 28, 1999 (FR) .............................. 99 09814

(51) Int. Cl.⁷ .............................................. B02C 17/20
(52) U.S. Cl. ........................................ 241/57; 241/299
(58) Field of Search ................................ 241/299, 300, 241/180, 57, 54

(56) References Cited

U.S. PATENT DOCUMENTS

| | | | | |
|---|---|---|---|---|
| 2,098,054 A | * | 11/1937 | McBerty | 241/180 |
| 3,224,839 A | | 12/1965 | Pierson | 23/259.1 |
| 3,930,799 A | | 1/1976 | Eweson | 23/259.1 |
| 5,875,979 A | * | 3/1999 | Walters et al. | 241/299 |

FOREIGN PATENT DOCUMENTS

| | | | | |
|---|---|---|---|---|
| DE | 1 592 743 | 6/1965 | | C05R/9/00 |
| EP | 0 148 375 | 7/1985 | | B07B/9/00 |
| FR | 2 746 410 | 9/1997 | | C12M/1/10 |
| GB | 1 069 396 | 5/1967 | | C05F/9/04 |
| GB | 1 384 475 | 2/1975 | | |
| GB | 1 551 019 | 8/1979 | | C10L/5/46 |

* cited by examiner

Primary Examiner—Mark Rosenbaum
(74) Attorney, Agent, or Firm—Wolf, Greenfield & Sacks, P.C.

(57) ABSTRACT

A drum for processing household, commercial solid waste and non-hazardous industrial waste. An inlet wall of the drum includes an opening to allow entry of waste into the drum to be treated. An outlet wall includes an opening for evacuation of treated waste from the drum. Further openings on the inlet and outlet walls provide ventilation, allowing outside air to circulate through the drum and the waste material being processed. A rotating envelope within the drum includes large cutters to tear and separate the waste and small cutters and points to further process the waste and separate the waste into its constituent parts. The large cutters are disposed in a helicoidal shape to advance waste entering the drum at the inlet wall towards the outlet wall for removal.

16 Claims, 5 Drawing Sheets

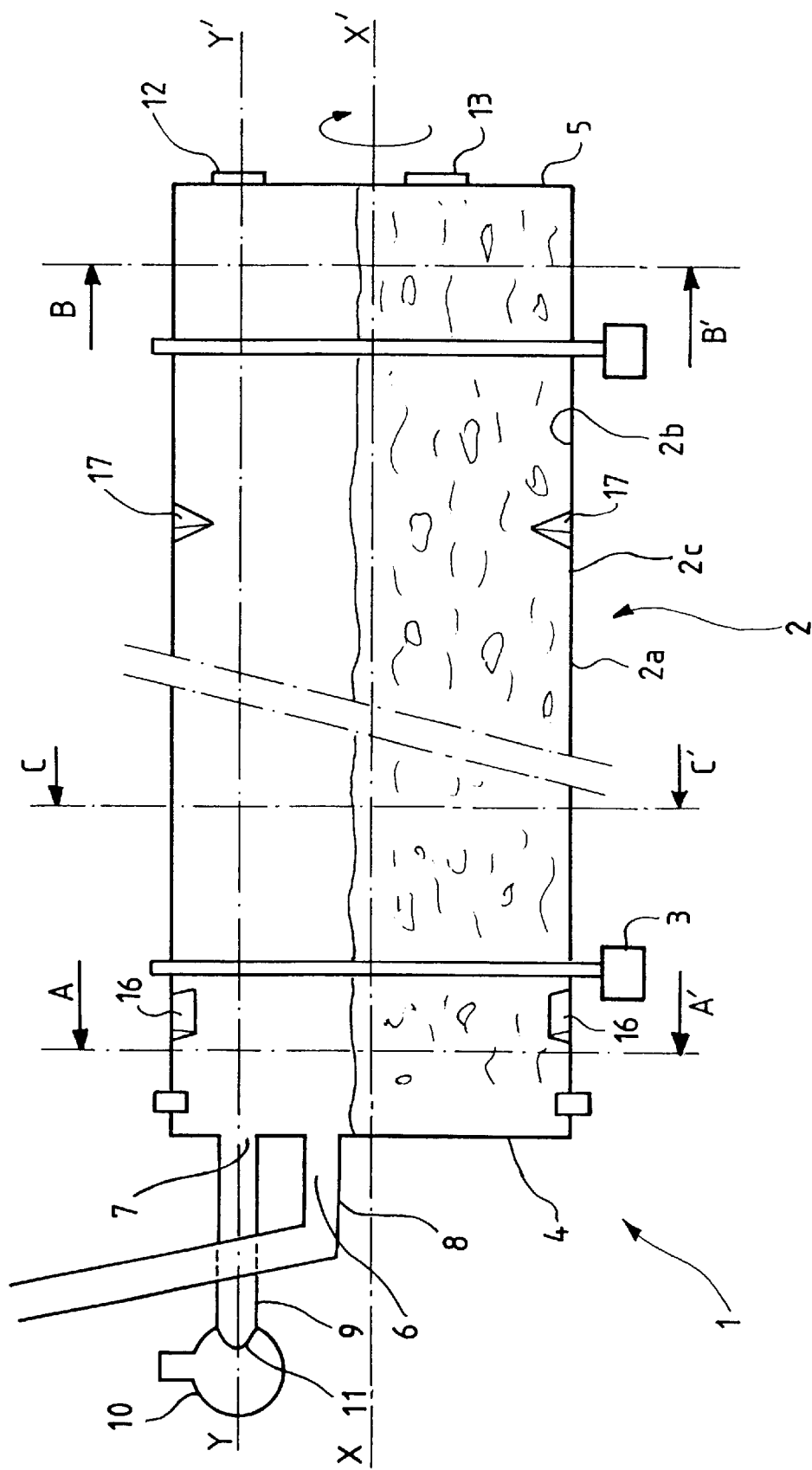
FIG_1

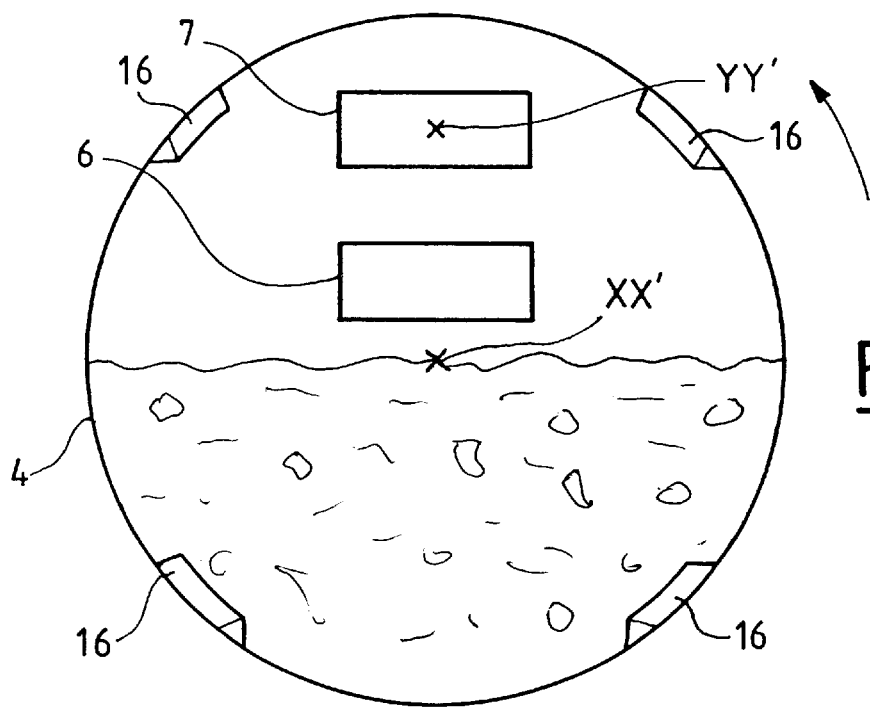
FIG_2
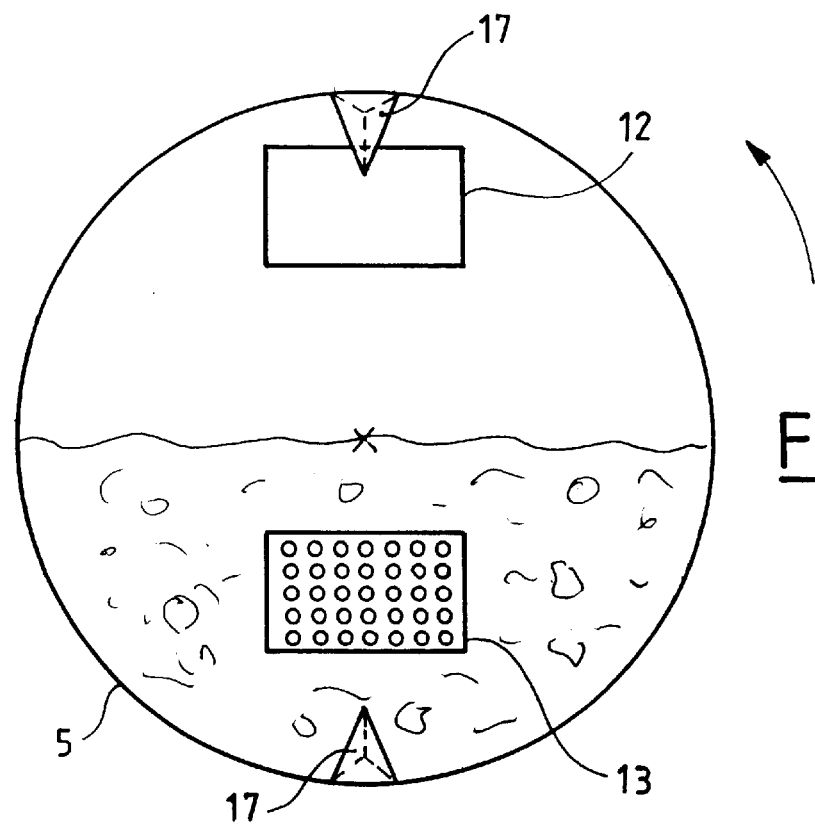
FIG_3A

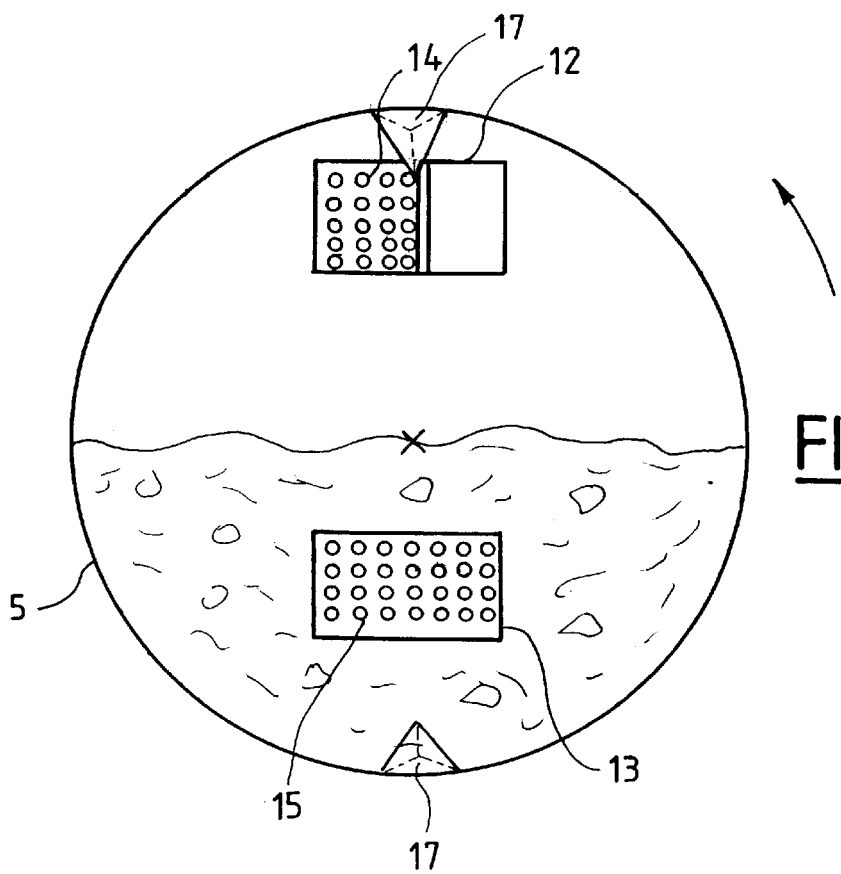
FIG_3B
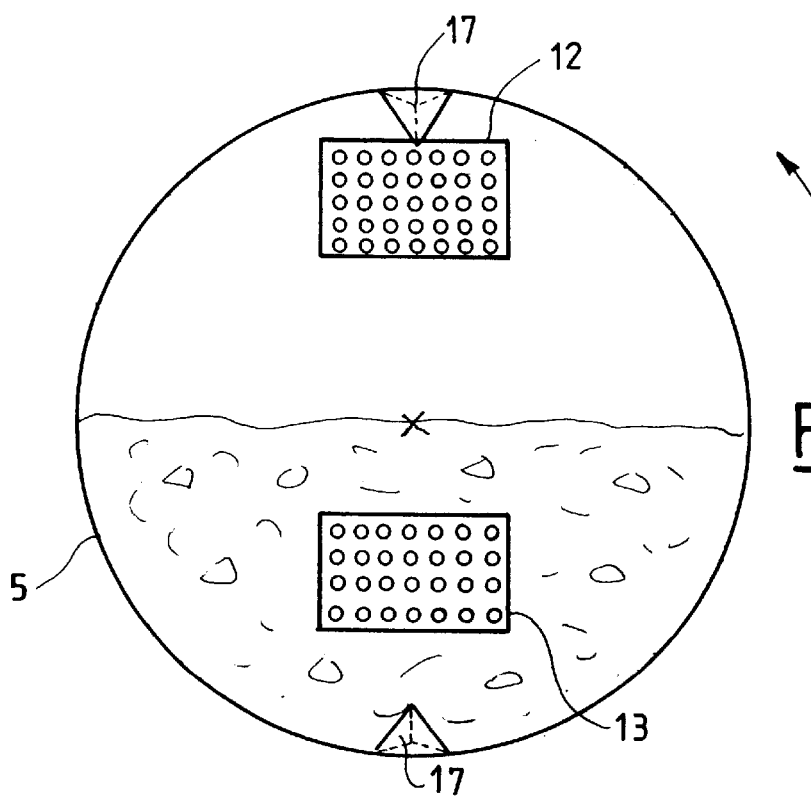
FIG_3C

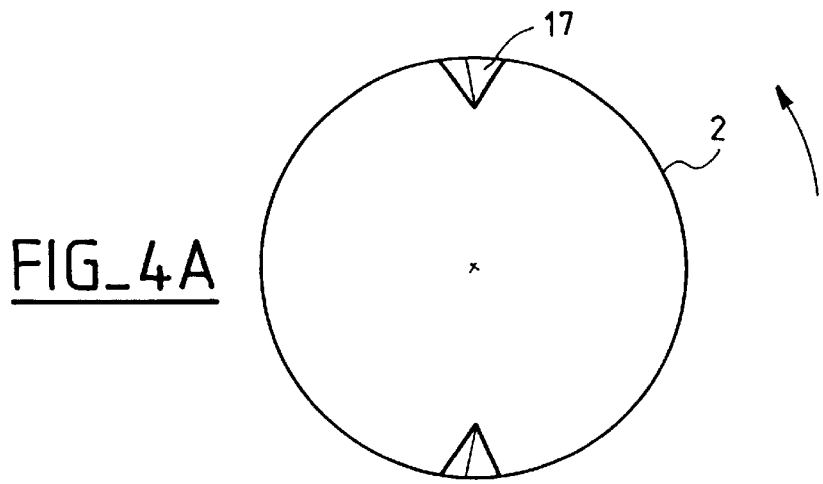
FIG_4A
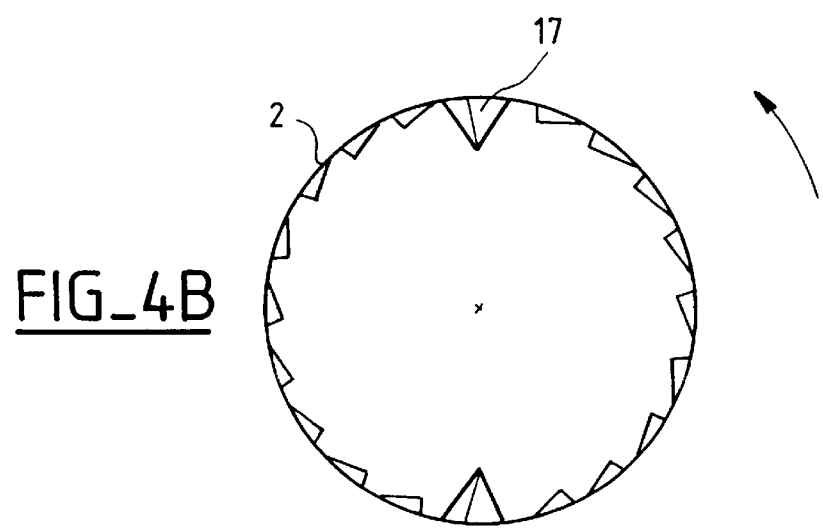
FIG_4B
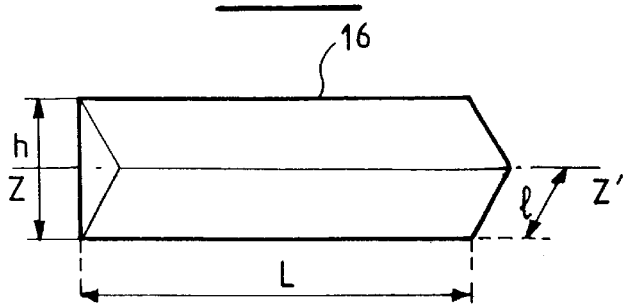
FIG_5
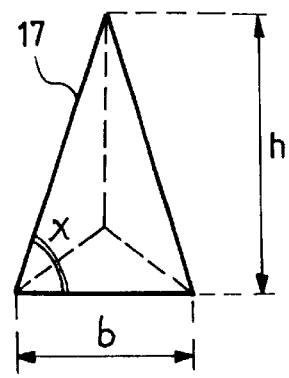
FIG_6

FIG_7
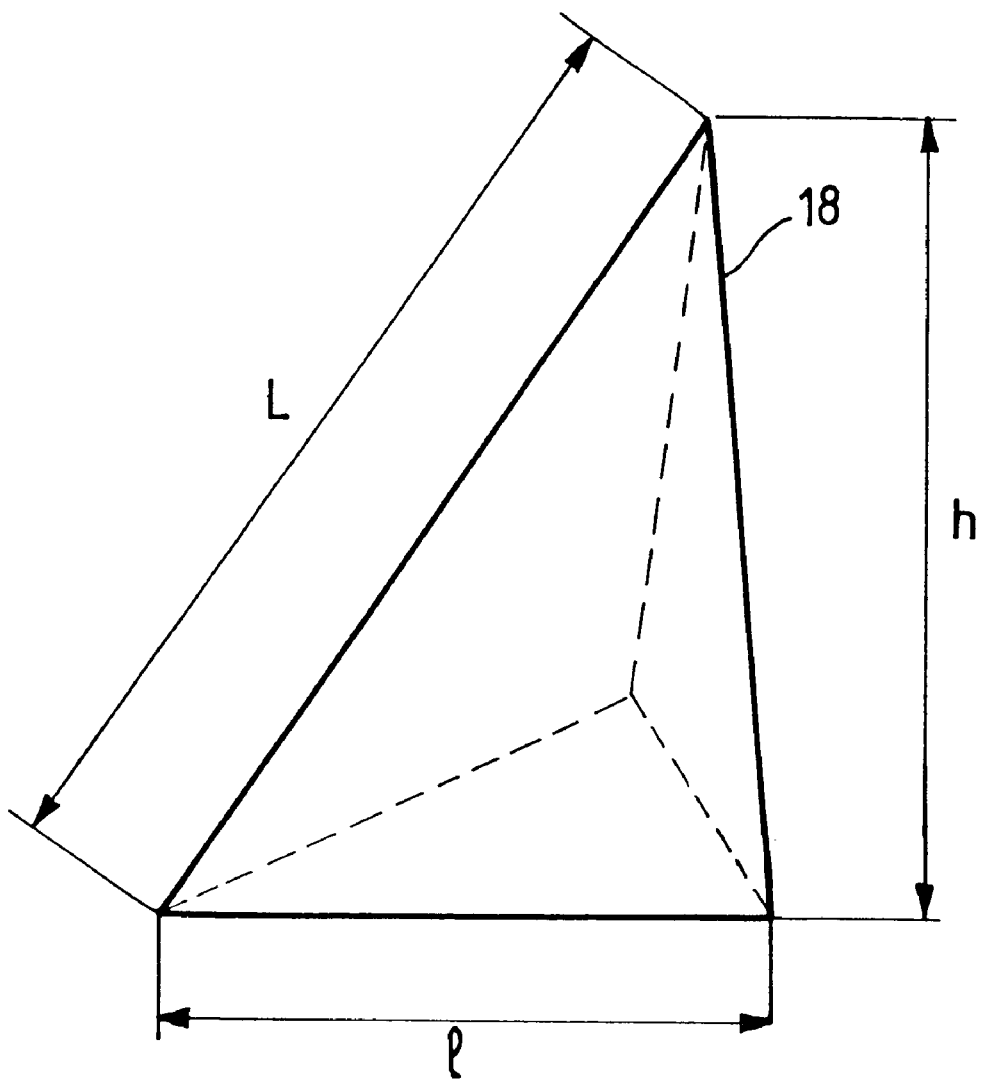

DRUM INTENDED FOR A MACHINE FOR PROCESSING WASTE AND A CORRESPONDING MACHINE

The present invention relates to a drum intended for a machine for the pre-processing and processing of household waste, commercial solid waste and non-hazardous industrial waste, and to such a machine.

The use of such a device for extracting cellulosic materials mixed with other materials such as plastic materials, light metals, and wood waste is already known from document FR 2 395 783. This device is constituted of a drum comprising a rotor, the latter turning rapidly and in a direction which is opposite to that of the drum. It comprises cutting fingers distributed in a helicoidal fashion on a first part of the rotor, and shredding teeth on a second part of this rotor.

Such a device has the major inconvenience of only treating cellulosic materials. In fact, it is unable to obtain a homogeneous mixture of an assembly of waste constituted of components of diverse natures, part of which could be transformed into compost.

One also knows from document FR 2 566 678 about an installation for processing waste, for example of household origin. This installation comprises a shredder, a drying and sorting device, and a means of air ventilation, which makes hot air cross the cylinder.

This device has the inconvenience of needing a source of hot air, which involves extra energy expenditure and consequently needs a complex processing installation.

Document FR 2 676 186 describes a procedure for processing refuse, such as household refuse, by separating the looser components from the more solid components. It also concerns a processing device.

According to this procedure, the looser components are shredded by projecting water under high pressure, whereas the most solid components, hardly shredded at all, are extracted from the drum in their initial state. The shredded components are transported outside the drum with the water.

The installation described in this document comprises a processing drum made to rotate around an axis which is not far from horizontal, and having an inlet opening for the arrival of the refuse to be processed and an outlet opening for the extraction of the most solid refuse. The wall of the drum is provided with perforations over the whole of its surface to allow the elimination of the loosest components, which are transported by the water.

Unfortunately, the presence of such a quantity of water projected under high pressure does not allow correct and non-powdery separation of each group of constituents taken in the dry state or simply slightly humidified.

As for document FR 2 464 097, it describes an installation for disintegration by crushing and shredding waste, for example of domestic origin. This installation comprises a cylindrical drum able to turn around a horizontal axis under the action of drive means. The drum, whose interior is divided by partitions, also comprises shredding bars, which penetrate the drum under the action of means of introduction provided at one end of the drum.

The bars and partitions present in the drum form a meshed structure. Such a structure operates efficiently together with the crushing elements to crush and shred the waste to be processed. The edges of the partitions and bars are sharp.

But such an installation does not allow delicate separation of the different constituents of household waste. In fact, one obtains a powdery type of mixture of the ensemble of the constituents.

Finally, document FR 2 746 410 discloses a drum intended for a machine for accelerated aerobic fermentation of organic waste. The drum comprises a cylindrical rotating envelope, and an outlet terminal transversal wall located at the end for discharging processed waste. The wall comprises an opening 18 off-centred relative to the horizontal rotation axis. This wall can either pivot in synchronisation with the rotating envelope, or can remain fixed relative to it. The opening 18 allows both the discharge of processed waste when it is in its low position as well as continuous ventilation of the drum when it is in its high position. The terminal wall also comprises, in the extension of the rotating envelope, a cylindrical lateral wall pierced by openings. These openings allow the passage of processed waste.

Unfortunately, a drum like this does not allow permanent ventilation of the waste when the opening 18 is in the discharge position, that is to say in the low position.

There also remains the need for a drum intended for a machine for pre-processing and processing of waste which is essentially of household origin, which allows household waste to be pre-processed by the continuous separation of fermentable components from the other components which have high added value, such as plastic materials, textiles, paper/cardboard, metallic scraps or yet again inert materials such as glass, pebbles, and this without transforming these other components into a powdery mixture. There also exists the need for a drum intended for such a machine allowing permanent ventilation of the drum even when it is in the position for discharging processed waste.

Thus the aim of the present invention is a drum intended for a machine for pre-processing and processing household waste, commercial solid waste or non-hazardous industrial waste comprising:

an elongated rotating envelope 2c comprising an external part 2a and an internal part 2b, a fixed transversal wall 4 at the arrival of the waste to be processed located at the inlet to the drum and immobile relative to the rotating envelope 2c, said wall comprising a first opening 7 linked to a ventilator 10 and a second opening 6 linked to a device for loading the waste, a transversal exit wall 5 for processed waste located at the outlet of the drum turning simultaneously with the rotating envelope, characterised in that the rotating envelope comprises big cutters 16, small cutters 18, and points 17 fixed in a detachable way, and in that the transversal exit wall 5 comprises two openings 12 and 13, one of which is situated in the upper half of the wall 5 and the other in the lower half of the wall 5.

The use of such a drum as described according to the invention has the advantage of obtaining a homogeneous and non-powdery mixture of waste, thanks to a correct prior sorting, and an easy processing for each type of constituent in household waste. Prior sorting of the waste carried out by using a drum according to the invention allows easier processing later for the different types of constituents.

The drum also has the advantage of being able to turn continuously around the clock in an active fashion during a period of loading/unloading, and in a slower fashion during an inactive period of non-loading/non-unloading. The drum is also of interest because it allows the simultaneous maceration of waste when it is in an active or inactive position because of its rotation, and the ventilation of the drum to constantly renew the vitiated air by means of an adjustable opening.

The drum can have a different speed of rotation according to whether it is in active or slow operation. Moreover, the speed of rotation can vary in function of the nature of the waste to be treated. According to the invention the rotating envelope of the drum can be chosen to be approximately circular or hexagonal in shape. A cross-section of hexagonal shape for this envelope can make it possible to improve the quality and the speed of shredding thanks to the presence of the angles of the hexagon.

The rotating envelopes comprise cutters and points in identical numbers and places, whether the cross-section be approximately circular or hexagonal.

The drum can have a maximum length ranging from 60 to 65 meters and preferably between 20 and 25 meters. The total length of the drum is defined in function of the nature of the waste to be treated.

The drum can have a diameter ranging from 3 to 5 meters.

The rotating envelope comprises first of all large size cutters arranged along a length from 0 to 5 meters starting from the transversal wall at the inlet of the waste. This portion of the drum comprises neither points nor small cutters. The small cutters, when they are present in the drum, are distributed regularly with the points on the same portion of the internal surface of the envelope which follows that carrying the large cutters. The small cutters are not necessarily present in the drum.

The position and density of the large and small cutters per unit of surface area on the envelope are part of the parameters for adjusting the machine according to the invention, as are the level of humidity of the waste to be treated and the speed of rotation of the drum.

The points have a role of shredding and tearing the waste during the rotation of the drum, while the small cutters have a "grater" role.

The main role of the large cutters is to facilitate the introduction and advance of the waste at the entrance to the drum and to shred the waste.

The small cutters, present in greater numbers than the large cutters, have the principal aim of playing the role of "grater" during the rotation of the drum. Their use makes it possible to obtain a higher level of tearing waste which has already been partially processed by the large cutters. For example, this is the case of waste with a paper/cardboard base where the drum allows them to be torn to a maximum in order to be able to recuperate them with the fermentable fraction at the outlet from the drum for later composting or methane processing.

The large cutters can be presented approximately in the shape of an angle where the two blades preferably have the shape of a "V" or an "L".

The large cutters can be of a length ranging from about 600 to 900 mm, a width ranging from about 100 to 250 mm, and a height ranging from about 350 to 500 mm.

The small cutters, preferably in the approximate shape of a flattened pyramid, can be of a length ranging from around 500 to 600 mm, a width ranging from around 100 to 250 mm and a height ranging from about 150 to 250 mm.

When they are applied on the internal surface of the envelope of the drum, the large cutters can present an angle $\alpha$ which is defined according to the direction of advancing the waste in the drum, and which can vary between 60° and 80°. Such an inclination of the cutters makes it possible to facilitate the progress of the waste right from its entry into the drum.

The large cutters are arranged in a helix in the drum in such a way that the cutting part is directly in contact with the waste during the rotation of the drum. The cutting part of the small cutter can be covered with a part in hard metal, detachable, to limit the phenomenon of abrasion when the waste comprises large quantities of abrasive elements.

The small cutters are preferably arranged staggered on the rotating envelope with a maximum of 2 small cutters per square meter of extended surface area of the drum.

The small cutters can be separated from each other by a distance ranging from 700 to 1000 mm. Moreover they can present a slight angle $\beta$ relative to the direction of advance of the waste ranging from 75° to 90°.

The points present on the surface of the rotating envelope are preferably arranged along a length of this envelope greater than 5 meters counting from the inlet transversal wall and going to the waste outlet transversal wall.

Preferably, the points have approximately the shape of a pyramid with three triangular faces, independent from each other and linked by classic mechanical means of fixation, such as nuts and bolts. The points can have a height ranging from about 350 to 500 mm, a base ranging from about 150 to 250 mm and an angle $\chi$, which is defined between any two adjacent sides linked to the base, which can range between 60° and 70°.

According to another variant, when the drum does not have any small cutters, the points can be separated from each other by a distance ranging from about 2 to 5 meters, and can be installed by groups of two opposite each other. The points are then arranged in such a way that one of the points of the pyramid is facing the waste to be processed transiting the drum.

When the drum is equipped with small cutters, the points, in groups of two, arranged opposite each other, are placed between two small cutters or in the place of a small cutter if the space between two small cutters is too narrow.

The cutters and the points can be dismantled easily, for example when the physico-chemical specifications of the waste are changed, in order to obtain a different result in terms of shredding, or for example in the event of wear of one of the parts.

According to the invention, the drum can turn at a speed ranging from 0.15 revolutions per minute to 5 revolutions per minute according to the nature of the waste, the quality of separation required downstream and the nature of operation of the drum (active or inactive). It is also possible to add water in such a way as to have a percentage of humidity sufficient for shredding waste essentially with a basis of paper/cardboard. The addition of water must be carried out in such a way that, above all, a bath is not obtained in which the waste to be processed floats on the surface. The humidified paper/cardboard forms a compact cake from which plastic materials, for example, can easily be detached. The separation of each type of constituent at the outlet from the drum is then much easier.

The time the waste remains in the drum can range from 6 to 24 hours if the waste comprises, for example, paper and/or cardboard which are not valorised in a biological way. On the other hand, in the case where the paper/cardboard must be valorised afterwards, then the time the waste remains in the drum can be increased to reach up to 2 days.

Whatever the quality and nature of the household waste, the drum can be filled to a volume ranging from about 60% to 85%.

Another aim of the invention is a machine for preprocessing and processing household waste comprising a drum such as that defined above, at least one drive means for making the drum rotate, means for forwarding the waste to be treated, means for recuperating and sorting the treated waste exiting from the drum, means for permanent ventilation by aspiration of outside air in such a way as to make the air circulate along an axis approximately horizontal in a direction opposite to that of the circulation of the waste during processing in the drum.

Preferably, the air arriving at the inlet of the drum is at a temperature ranging between −5° and +35° C. According to one variant, the air crosses the interior of the drum at a speed ranging between 0.2 to 0.4 m/sec.

The machine can comprise means for loading the waste, constituted of a loading hopper provided with a controlled closing flap with means for loading so that the flap is open during the loading phase and closed during the non-loading phase.

Finally, according to another variant, the ventilator can be associated with a device for processing and/or deodorising the vitiated air extracted from the drum.

Preferably, the ventilator comprises a filter with easy access for maintenance which makes it possible to avoid clogging the ventilator as a result of aspiration of air full of easily flying waste during the loading of the drum, such as sheets of plastic material.

The drum according to the invention as well as the machine will be described in more detail with the help of the drawings which follow, which comprise examples of production and which are in no way restrictive.

FIG. 1 is a diagrammatic section along a lateral axial plane of a machine conforming to the invention.

FIG. 2 is a diagrammatic section of the drum along an axis AA' conforming to the invention.

FIGS. 3A, 3B and 3C each represent a diagrammatic section of the drum along an axis BB' conforming to the invention, in different positions.

FIGS. 4A and 4B represent a diagrammatic section of the drum along an axis CC'.

FIG. 5 represents a diagram of a large cutter in three dimensions.

FIG. 6 represents a diagram of a point in three dimensions.

FIG. 7 represents a diagram of a small cutter in three dimensions.

As can be seen in FIG. 1, the waste pre-processing and processing machine is represented by the general reference 1.

This machine comprises a drum 2, at least one means for making the drum rotate (not shown), means for sorting the waste exiting from the drum (not shown), and means for forwarding the waste to be treated (not shown).

The drum 2, constituted of a rotating envelope 2c with an external part 2a and an internal part 2b, is elongated and has an approximately cylindrical shape. The whole of the drum is constituted of steel.

Drum 2 turns around an axis XX' which is approximately horizontal with the help of drive means for rotation. The drum 2 is kept approximately horizontal with the help of fixation means 3 spaced regularly along the total length of the drum. The drum has a total length of about 60 meters and a diameter of about 5 meters.

Drum 2 comprises an opening end 4 and a terminal end 5 located at the inlet and outlet of the drum respectively.

End 4 is constituted of a solid transversal wall in steel comprising two openings 6 and 7. These openings 6 and 7 are set in the first upper half of the drum. The opening 6 is linked by a pipe 8 to a means for forwarding the waste to be processed (not shown). Opening 7 is linked by a duct to a ventilator 10 with a filter 11 at its entrance.

End 4 of the drum is fixed relative to the rotating envelope which turns around axis XX'. End 5 is also constituted of a solid transversal wall in steel comprising two openings 12 and 13.

Openings 12 and 13 are located respectively in the upper half and the lower half of the drum 2, the upper and lower halves being defined in relationship to the axis XX'.

As can be seen in FIGS. 3B and 3C, opening 12 is set in the extension of opening 7. The two openings 7 and 12 are set on the same axis YY' parallel to the axis XX'.

Opening 12 can be closed with the aid of a grid 14 perforated with regularly spaced holes, according to the utilisation requirements of the drum 2.

Opening 13 is constituted of a fixed grid 15, perforated with regularly spaced holes.

When the drum is functioning, it is filled to about 60% of its total volume with household waste.

The envelope of the drum comprises large cutters 16 on its internal part 2b arranged in helicoidal fashion starting from the opening end 4 and, along a 4 meter length of the drum counting from the transversal wall 4. The large cutters have an L-angle shape, one of whose ridges is fixed on the internal wall 2b and forms an angle α equalling 70° relative to the direction of advance of the waste. The large cutters 12 are present, 7 in number, in this zone.

The remainder of the surface of the internal part 2b is covered with points 17 arranged two by two, opposite each other, every two meters, up to the end 5 of the drum.

The points, which have the shape of a pyramid, are arranged on the internal wall 2b of the drum in such a way that one of the points of this pyramid is facing the waste forwarded by rotation of the drum 2.

The points of the two pyramids in facing relationship do not touch (this is shown in FIG. 4A).

FIG. 4B shows a variant according to which the part 2b of the drum comprises points and small cutters arranged regularly over the whole of the circumference of drum 2.

As can be seen in FIG. 5, the large cutters 16 have a length L of 800 mm, a width l of 200 mm measured between the axis and one of the cutting edges of the cutter, and a height h of 400 mm.

As can be seen in FIG. 6, the points 17 have a length L of 350 mm, a base b of 200 mm and an angle $\chi$ of 60°.

The arrows marked on FIGS. 2, 3A to 3C and 4A, 4B represent the direction of rotation of the drum.

As can be seen in FIG. 7, the small cutters have a length L of 700 mm, a width l of 200 mm and a height h of 200 mm.

When the drum 2 is functioning, the household waste to be treated is incorporated in the drum through the opening 6 until about 60% of the total volume of the drum is filled. While filling, the drum turns around the axis XX' at a speed of about 2 revolutions/minute. During rotation, the large cutters 12 arranged at the entrance to the drum seize the waste in such a way as to make it advance progressively through the internal chamber of the drum, and to shred it.

The pre-processed waste is then directed to the internal part 2b of the drum comprising the points 17 whose aim is to tear the pre-processed waste. This forward movement is achieved thanks to the helicoidal arrangement of the large cutters, as well as the rotation of the drum.

The shredded and torn waste thus arrives at the terminal end 5 of the drum 2 after staying for a length of time of 24 hours in the drum.

As can be seen in FIGS. 3A, 3B and 3C, the drum can function with an opening 12 open or totally closed by a grid 14. FIG. 3B shows the opening 12 during closure.

In the active mode of functioning, that is to say when the waste is being loaded/unloaded, the drum 2, because of its rotation, allows simultaneous loading and unloading of the waste at each end 4 and 5 respectively.

In fact, in active mode, the opening 12 is fully open. Because of the rotation of the drum 2, the opening 12 located in the high position finds itself alternately in the low and then the high position and thus allows evacuation of the treated waste through this opening.

The drum 2 also functions with permanent ventilation with the help of the openings 12 and 13 and the ventilator.

In addition, when the non-gridded opening 12 is located in the high position, it allows maximum ventilation of the drum and when it is in the low position, it evacuates the treated waste, the ventilation then being ensured by opening 13 which passes from the low position to the high position.

The ventilation of the drum is at its maximum during the active mode of the drum 2 because of the maximum opening of the opening 12.

It is at its minimum in the non-loading/non-unloading mode (inactive), when the opening 12 is closed by means of the grid 14. The closing of the drum by the grid 14 allows the ventilation to continue in inactive mode through the gridded opening 13 which is then in the high position, while avoiding any unloading of waste retained by the grid 14 when the latter is in the low position.

Of course, the diameter of the holes of the grid 14 is less than that of the smallest particles of waste treated so as to retain them correctly in the chamber of the drum until the moment they are evacuated.

According to the speed of rotation of the drum, the openings 12 and 13 allow its ventilation in an alternating fashion while simultaneously carrying out the processing of the waste through simple rotation of the drum.

What is claimed is:

1. A drum intended for a pre-processing and processing machine for household waste, commercial solid waste and non-hazardous industrial waste comprising:
    an elongated rotating envelope comprising an external part and an internal part,
    a fixed transversal inlet wall for the arrival of the waste to be processed located at an inlet of the drum and immobile relative to the rotating envelope, said wall comprising a first opening linked to a ventilator, and a second opening linked to a device for loading the waste.
    a transversal outlet wall for the processed waste located at the outlet of the drum turning simultaneously with the rotating envelope,
    wherein the rotating envelope comprises large cutters, small cutters, and points fixed so that they can be detached, and the transversal outlet wall comprises two openings one of which is situated in the upper half of the wall and the other in the lower half of the wall.

2. A drum according to claim 1, wherein the large cutters are arranged along an internal envelope less than or equal to 5 meters from the inlet transversal wall.

3. A drum according to claim 1, wherein the large cutters are arranged in a helix at the inlet to the drum.

4. A drum according to claim 1, characterised in that the small cutters (18) are arranged staggered over a length of the rotating envelope greater than or equal to 5 meters counting from the inlet transversal wall (4).

5. A drum according to claim 1 wherein the large cutters, with the approximate shape of an L-angle, have a length ranging from 600 to 900 mm, a width ranging from 100 to 250 mm and a height ranging from 350 to 500 mm.

6. A drum according to claim 1, wherein the small cutters having the approximate shape of a flattened pyramid, are of a length ranging from 500 to 600 mm, a width ranging from 150 to 250 mm and a height ranging from 150 to 250 mm.

7. A drum according to claim 1, wherein the points are arranged along a length of the rotating envelope greater than 5 meters from the inlet transversal wall.

8. A drum according to claim 1, wherein the drum is equipped with small cutters, the points arranged in groups of two are placed between two small cutters or in the place of a small cutter if the space between two small cutters is too narrow.

9. A drum according to claim 1, wherein the points have the approximate shape of a pyramid composed of three triangular faces, independent from each other and linked by mechanical means of fixations, so that they have a height ranging from about 350 to 500 mm, a base ranging from about 150 to 250 mm and an angle $\chi$ which is defined between two adjacent sides linked to the base ranging from about 60° to 70°.

10. A drum according to claim 1, wherein the points are arranged in groups of two, said groups being separated from each other by a distance ranging from about 2 to 4 meters.

11. A drum according to claim 1, wherein the internal envelope comprises, starting from the inlet wall, large cutters then points, the large cutters and the points being distributed uniformly as far as the outlet of the drum.

12. A pre-processing and processing machine for household waste comprising:
    a drum,
    at least one drive means for the rotation of the drum,
    means for forwarding the waste to be processed,
    means for recuperation and sorting the processed waste exiting from the machine,
    permanent means of ventilation comprising a ventilator through aspiration of outside air such that air passes through the drum along a horizontal axis in a direction opposite to that which the forwarding means advances the waste being processed in the drum,
    wherein the drum comprises:
        an elongated rotating envelope comprising an external part and an internal part,
        a fixed transversal inlet wall for the arrival of the waste to be processed located at an inlet of the drum and immobile relative to the rotating envelope, said wall comprising a first opening linked to a ventilator, and a second opening linked to a device for loading the waste,
        a transversal outlet wall for the processed waste located at the outlet of the drum turning simultaneously with the rotating envelope,
        wherein the rotating envelope comprises large cutters, small cutters, and points fixed so that they can be detached, and the transversal outlet wall comprises two openings one of which is situated in the upper half of the wall and the other in the lower half of the wall.

13. A machine according to claim 12, wherein the air at the inlet to the drum is at a temperature ranging between about −5° and +35° C.

14. A machine according to claim 12, wherein the air crosses the interior of the drum at a speed ranging from 0.2 to 0.4 m/sec.

15. A machine according to claim 12, wherein the means of loading the waste includes a loading hopper equipped with a controlled closing flap, with means of loading in such a way that the flap is open during the loading phase and closed during the non-loading phase.

16. A machine according to claim 12, wherein the ventilator is linked to a device for treating and/or deodorizing the polluted air extracted from the drum.

* * * * *

UNITED STATES PATENT AND TRADEMARK OFFICE
CERTIFICATE OF CORRECTION

PATENT NO. : 6,409,106 B1
DATED : June 25, 2002
INVENTOR(S) : Jean-Pierre Levasseur and Bernard Combaneyre It is certified that error appears in the above-identified patent and that said Letters Patent is hereby corrected as shown below:

<u>Column 7,</u>
Claim 4, should read as shown below:
   4. A drum according to Claim 1, wherein the small cutters are arranged staggered over a length of the rotating envelope greater than or equal to 5 meters from the inlet transversal wall.

Signed and Sealed this

Fourth Day of May, 2004

JON W. DUDAS
*Acting Director of the United States Patent and Trademark Office*